United States Patent
Ohms et al.

[11] 3,877,537
[45] Apr. 15, 1975

[54] EMERGENCY STEERING BY WHEEL BRAKING ACTION

[75] Inventors: Edward J. Ohms, Washington; James M. Stanley, Oreana; Lawrence F. Schexnayder, Joliet, all of Ill.

[73] Assignee: Caterpillar Tractor Company, Peoria, Ill.

[22] Filed: Feb. 8, 1973

[21] Appl. No.: 330,518

[52] U.S. Cl. ............. 180/6.3; 180/6.34; 180/79.2 B
[51] Int. Cl. ............................................ B62d 11/08
[58] Field of Search ......... 180/6.24, 6.26, 6.3, 6.34, 180/79.2 B

[56] References Cited
UNITED STATES PATENTS

| | | | |
|---|---|---|---|
| 1,175,917 | 3/1916 | Arnoldi | 180/6.34 |
| 2,209,149 | 7/1940 | Briand | 180/6.3 X |
| 2,331,214 | 10/1943 | Milster | 180/6.3 |
| 2,360,843 | 10/1944 | Boldt | 180/6.3 |
| 2,442,601 | 6/1948 | House et al. | 180/6.3 |
| 2,454,999 | 11/1948 | Eaton | 180/6.3 |
| 2,474,961 | 7/1949 | Sneed | 180/6.3 |
| 3,603,424 | 9/1971 | Blood et al. | 180/79.2 B |

FOREIGN PATENTS OR APPLICATIONS

| | | | |
|---|---|---|---|
| 678,123 | 7/1939 | Germany | 180/6.34 |
| 410,589 | 4/1945 | Italy | 180/6.3 |

Primary Examiner—Robert J. Spar
Assistant Examiner—Leslie J. Paperner
Attorney, Agent, or Firm—Phillips, Moore, Weissenberger, Lempio & Strabala

[57] ABSTRACT

An emergency steering system for a vehicle which is normally steered by a mechanical and hydraulic fluid system and which has fluid actuated brakes. Pressurized fluid is directed to a valve which connects with the right and left brakes of the vehicle, and such valve is normally mechanically disconnected from the primary steering system, but may be mechanically connected thereto by manual means or by automatic means responsive to non-operation of the mechanical and hydraulic fluid steering system, to direct pressurized fluid to the right or left brake, depending on the direction in which the steering wheel is turned, to cause what is known as steering-by-braking.

10 Claims, 4 Drawing Figures

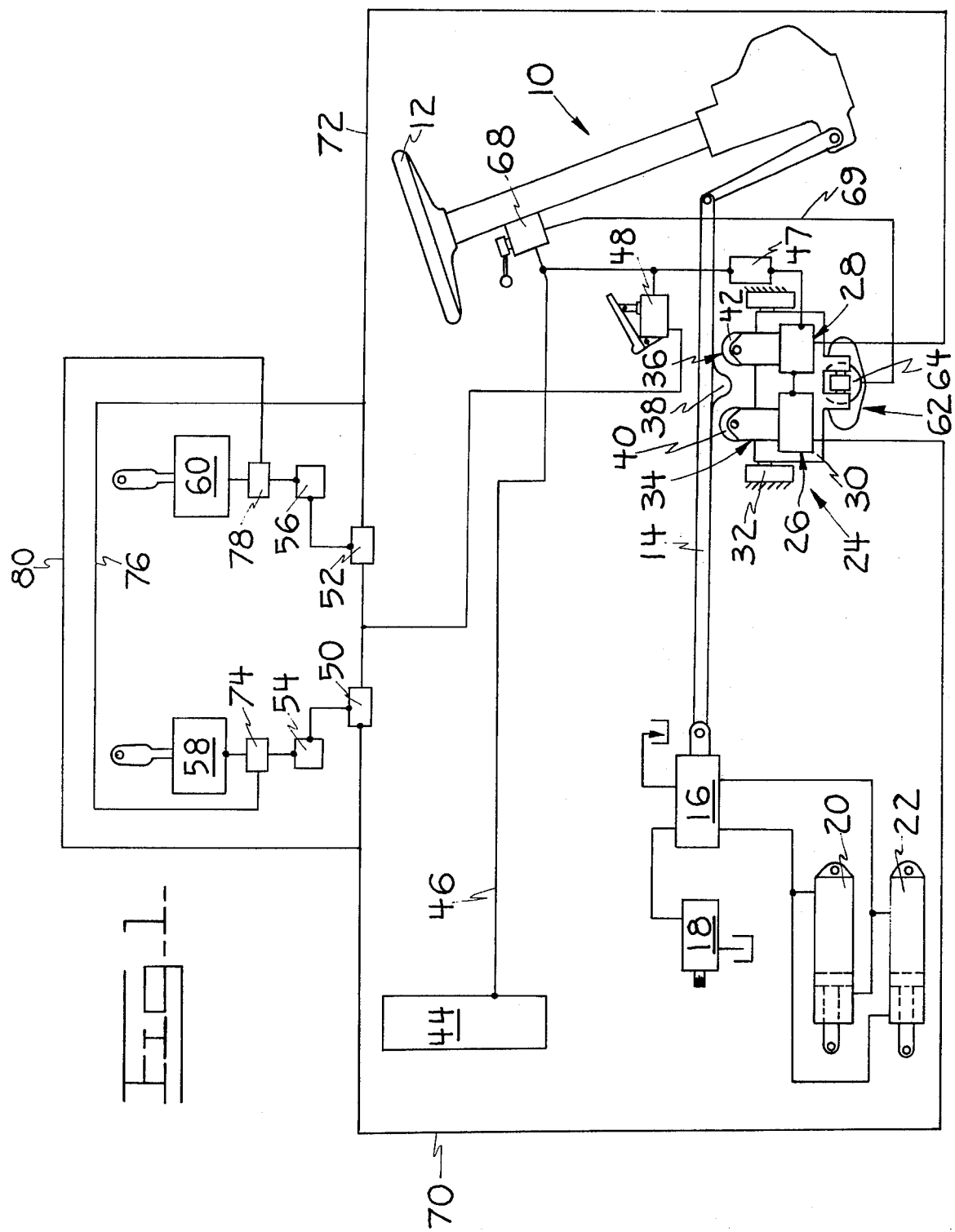

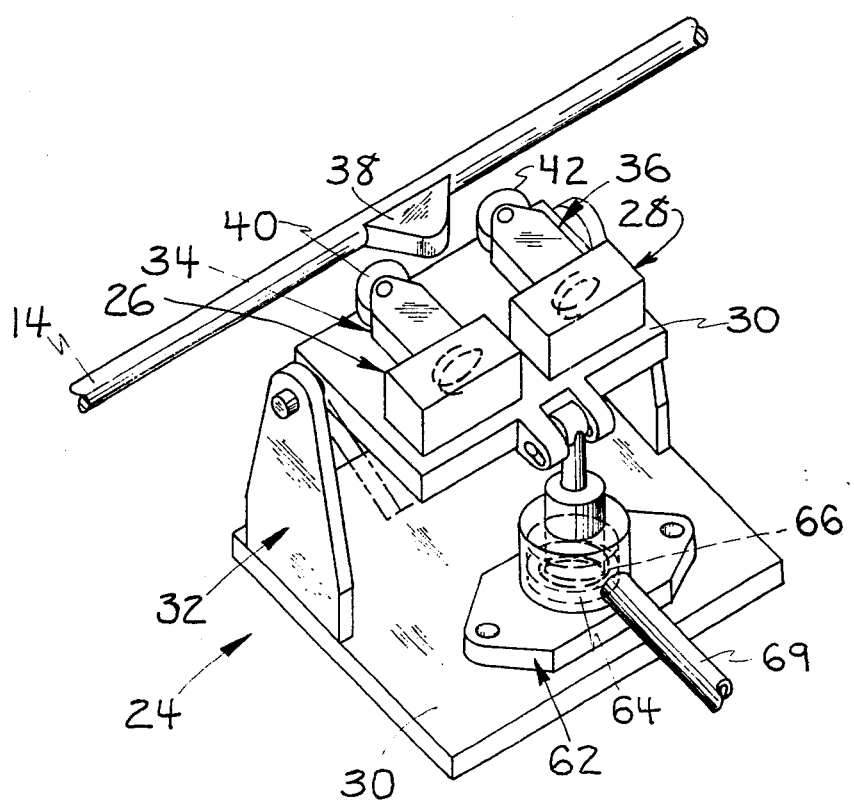

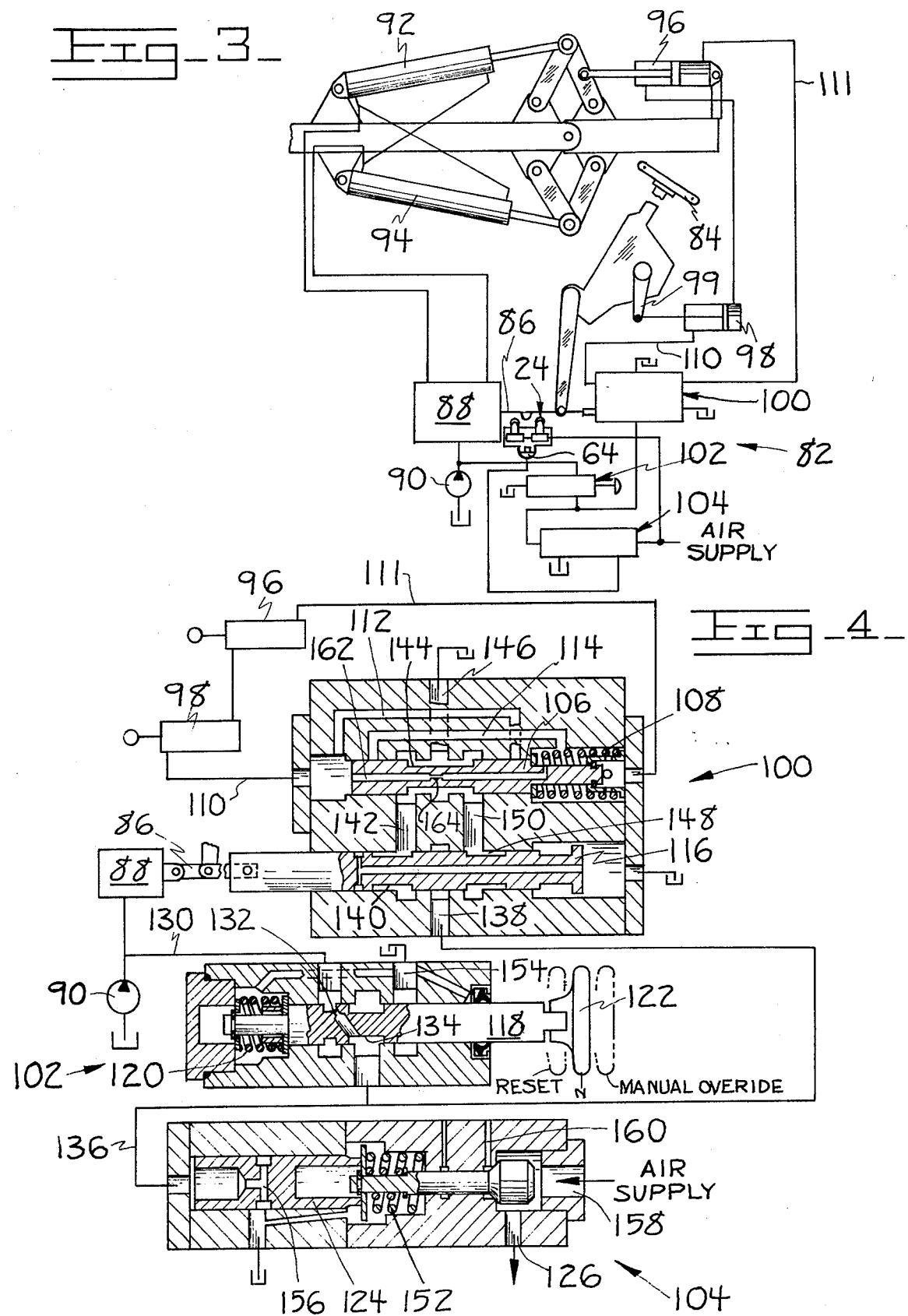

EMERGENCY STEERING BY WHEEL BRAKING ACTION

BACKGROUND OF THE INVENTION

This invention relates to vehicle emergency steering systems, and more particularly, to such a system which includes a valve for directing fluid pressure to brakes on either side of the vehicle to achieve what is known as steering-by-braking.

A system of the type generally described herein is disclosed in U.S. Pat. No. 3,603,424 to Blood et al. (assigned to the assignee of this invention). In such system, steering of the vehicle is normally achieved by a primary hydraulic steering system. In addition there is a valve mechanically connected with a control rod of the primary system. Such valve, upon application of fluid pressure thereto, directs fluid to the brakes on one or the other side of the vehicle, through movement of the steering wheel (and control rod therewith) in one and the other direction.

In U.S. Pat. No. 3,603,424, it is to be noted that the valve thereof, for such purpose is always in mechanical engagement with the control rod, even when such valve is not needed (i.e., the emergency steering-by-braking is not being used).

Such a system, while being relatively effective in operation, subjects the valve to a degree of wear which could detrimentally affect its operation when the emergency system is actually needed. Such continued movement of a valve, of course, shortens the service life of the valve, also.

SUMMARY OF THE INVENTION

It is an object of this invention to provide in a vehicle, an emergency steering system which incorporates valve means which are not subjected to wear until such emergency steering system is utilized.

It is a further object of this invention to provide a main vehicle and emergency steering system which provides normal and/automatic means for activation thereof.

It is a still further object of this invention to provide in a vehicle an emergency steering system which, while fulfilling the objects, is simple in design and operation.

Broadly stated, the invention is in a vehicle having a steering system comprising a steering device normally operable in one and the other directions to steer the vehicle, and brake means on either side of the vehicle, actuatable by fluid pressure from a fluid pressurre source. The invention comprises a vehicle emergency steering system comprising valve means movable to a first position to be mechanically interengaged with the steering device for response to movement of the steering device in one direction to direct fluid pressure from the fluid pressure source to only the brake means on one side of the vehicle to brakesteer the vehicle in one direction, and for response to movement of the steering device in said other direction to direct fluid pressure from the fluid pressure source to only the brake means on the other side of the vehicle to brake-steer the vehicle in the other direction. The valve means are movable to a second position mechanically disengaged from the steering device so as to be non-responsive to movement of the steering device. Means are operatively connected to the valve means for moving the valve means to the first and second positions.

BRIEF DESCRIPTION OF THE DRAWINGS

These and other objects of the invention will become apparent from a study of the following specification and drawings, in which:

FIG. 1 is a schematic view showing a steering circuit incorporating the inventive emergency steering system;

FIG. 2 is a perspective view of the valve means of the emergency steering system;

FIG. 3 is a schematic view showing a second embodiment of the steering circuit incorporating the inventive emergency steering system; and FIG. 4 is a sectional view of the actuator means of the emergency steering system embodiment of FIG. 3.

DESCRIPTION OF THE PREFERRED EMBODIMENTS

Shown in FIG. 1 is the inventive steering and brake system. The system includes a steering device 10 for a vehicle (not shown). The steering device 10 includes a steering wheel 12 and a control rod 14 responsive to movement of the steering wheel 12 to be movable in one and the other directions along its longitudinal axis. The steering wheel 12, through such control rod 14 movement, controls a steering valve 16 to direct hydraulic pressure from a pump 18 selectively through a pair of steering jacks 20,22 to steer the vehicle, as described in U.S. Pat. No. 3,603,424.

Pivotally connected relative to the vehicle are valve means 24, best shown in FIG. 2. The valve means 24 are made up of first and second valves 26,28 fixed to a platform 30 which is in turn pivotally fixed to a frame 32. The frame 32 is fixed relative to the vehicle. The valves 26,28 have extended portions 34,36, and the pivoting of platform 30 in one direction moves the valve 26,28 so that the extended portions 34,36 are adjacent the control rod 14. The valves 26,28 are normally closed, and are of the type wherein the extended portions 34,36 may be moved inward of the valve bodies (away from the longitudinal axis of the control rod 14) to open such valves 26,28, the extended portions 34,36 normally being biased outwardly in the direction toward the longitudinal axis of the control rod 14 by internal springs.

With the valve means 24 moved so that the extended portions 34,36 are adjacent the control rod 14, the valve means 24 and control rod 14 are mechanically interengaged by means of a cam 38 fixed to and extending from the control rod 14 and movable with the control rod 14, and rollers 40,42 which make up part of the extended portions 34 and 36 respectively. With the valve means 24 in such position, the rollers 40,42 are positioned to be in rolling contact with the cam 38. In such situation, the valve means 24 are responsive to movement of the steering wheel 12 in one direction to open valve 26, and to movement of the steering wheel 12 in the other direction to open valve 28.

The valve means 24 are also movable, through such pivoting, to a position mechanically disengaged from the control rod 14, so as to be non-responsive to movement of the control rod 14.

Valves 26,28 are continuously supplied with pressurized air from an air tank 44 through a line 46, and a pressure regulator 47. Also, a foot brake control valve 48 is continuously supplied with pressurized air, so that upon actuation thereof, pressurized air is supplied to check valves 50,52, through quick release valves 54,56 and to wheel brake actuating cylinders 58,60, as is well known.

The means for moving the platform 30, and thus the valves 26,28 are shown at 62. Such means 62 includes a cylinder 64 which includes a spring 66 as shown to bias the cylinder 64 into a retracted position, to in turn bias the valves 26,28 into positions removed from the control rod 14. A manually actuated valve 68 is included for selectively applying pressurized air from the tank 44 through a line 69 to the cylinder 64 to extend the cylinder 64. such extension of the cylinder 64 pivots platform 30 to bring extended portions 34,36 of valves 26,28 to adjacent the control rod 14 as previously described.

Normally, the valve means 24 are held in non-responsive position, with extended portions 34,36 removed from control rod 14, by spring 66. Under normal steering of the vehicle, no wear is placed on valves 26,28 from the movement of control rod 14. However, upon failure of the primary steering system, the valve 68 would be actuated to supply pressurized air to the cylinder 64 to extend the cylinder, to mechanically in turn interengage valves 26,28 with the cam 38 of control rod 14. Turning the steering wheel 12 in one direction moves the control rod 14 to bring cam 38 into contact with roller 40, moving the extended portion 34 away from the longitudinal axis of the control rod 14, to open the valve 26 and direct pressurized air through a line 70 to only wheel brake actuating cylinder 58, to steer the vehicle in one direction. Likewise, turning the steering wheel 12 in the other direction moves the control rod 14 to bring cam 38 into contact with roller 42, moving the extended portion 36 away from the longitudinal axis of the control rod 14 to open the valve 28 and direct pressurized air through line 72 to only wheel brake actuating cylinder 60, to steer the vehicle in the other direction. The springs included in valves 26,28 insure that the valves 26,28 close when the cam 38 is removed therefrom.

Included is a system for allowing steering-by-braking even when the foot brake control valve 48 has been actuated. A pilot operated exhaust valve 74 is connected by a line 76 to line 72 connecting with valve 28, and a pilot operated exhaust valve 78 is connected by a line 80 to line 70 communicating with valve 26. With this arrangement, if the steering wheel 12 is turned so that the cam 38 opens valve 26, air pressure is communicated to brake control cylinder 58. Such air supply communicates through line 80 to the exhaust valve 78 to open that valve 78 and dump the air from brake control cylinder 60 to disengage that brake and permit steering by the continued engagement of the brake actuated by brake control cylinder 58. The system operates, of course, in a similar manner if the steering wheel 12 is rotated in the opposite direction.

In FIGS. 3 and 4 is shown another embodiment of valve means 24 actuation means, shown generally at 82, and which substitutes for the hand-actuated valve 68 of FIGS. 1 and 2. In such embodiment, a steering wheel 84 operates a control rod 86 which in turn operates a steering valve 88 to direct hydraulic pressure from a pump 90 selectively to a pair of steering jacks 92,94 to steer the vehicle, as described in the previous embodiment. A cylinder 96 is connected to be responsive to actual turning of the vehicle, and interconnects with a slave cylinder 98 responsive to movement of the cylinder 96, which connects to a link 99 on the steering gear housing, this system being fully described in U.S. Pat. No. 3,444,948 to Bianchetti et al (assigned to the assignee of this invention).

For purposes of this application, it is sufficient to understand that, if actual vehicle steering takes place through movement of steering jacks 92,94, cylinders 96,98 move in response to such movement.

The actuation means 82 is made up of a valve 100, a valve 102, and a pressure control valve 104. Valve 100 includes a spool 106 disposed in a middle position by a spring 108, and with the opposite ends interconnected by means of hydraulic lines 110,111, with cylinders 96 and 98 to be responsive to movement thereof in one and the other directions. Passages 112,114 are included in valve 100 to permit flow of hydraulic fluid between cylinder 96 and cylinder 98 when the spool 106 has moved a certain amount in either direction. In addition, valve 100 includes a second spool 116 reciprocable therein and connected to control rod 86, for movement therewith. Valve 102 includes a spool 118 disposed in position by a spring 120 and movable by means of a knob 122. And valve 104 also includes a spool 124 which, in its rightward position, keeps pressurized air from being supplied through a passage 126 to the cylinder 64 which moves the valve means into mechanical interengagement with the control rod 86, so that brake steering of the vehicle can be achieved.

In normal operation, pressurized hydraulic fluid is supplied from pump 90 through a line 130 through orifice 132, to annular channel 134 in valve spool 118, and through line 136 to act on the left end of the spool 124 to hold it in its rightward position, cutting off pressurized air from cylinder 64. Such pressure is maintained on valve spool 124 by valve spool 116 blocking flow through passage 138 in valve 100. With the steering system in proper order, movement of the steering wheel 84 in one direction moves valve spool 116 rightward, bringing a channel 140 in valve spool 116 into communication with passage 138 and a passage 142. If spool 106 had remained in its original position, pressure would then pass through channel 144 formed in spool 106 and out passage 146.

However, with normal steering of the vehicle taking place, cylinders 96 and 98 will move, in turn moving spool 106 to the right to block off passage 142, so that pressure is maintained in valve 100 to keep spool 124 rightward. Similarly, movement of the steering wheel 84 in the other direction moves valve spool 116 leftward, bringing a channel 148 in valve spool 116 into communication with passage 138 and a passage 150. Spool 106 will also move to the left to block off passage 150 so that again pressure is maintained in valve 104 to keep spool 124 rightward.

With failure of the primary steering system, upon movement of the steering wheel 84, cylinders 96, 98 will not be moved, since steering jacks 92, 94 are inoperative, so that in turn spool 106 will remain centered. However, spool 116 is still responsive to steering wheel 84 movement, and upon sufficient turning thereof, channel 140 will come into communication with passage 138 and passage 142 or into communication with passage 138 and passage 150, so that pressure on spool 116 will be relieved therethrough and through channel 144 in spool 106, and passage 146. Upon release of pressure on spool 124, a spring 152 moves spool 124 leftward, allowing pressurized air to flow to cylinder 64, moving valve means 24 into operating position.

Thus, the system automatically brings in the emergency steering system when needed.

The spool 118 may be moved by means of knob 122 to dump pressure from spool 124 to channel 134 in spool 118 and through a passage 154 in valve 102. Thus, manual means for actuating the system are provided in addition to the already disclosed automatic means.

Valve 100 is also sensitive to direction of steering movement as compared to the direction that the spool 116 is moved by the steering linkage. For example, if the tractor is operating on a left-to-right side hill with a failure in the primary steering system, turning of the steering wheel 84 in a direction to steer the tractor up the hill may permit the tractor to be steered downhill by the slope conditions. Under these circumstances, the spool 106 would be moved in a direction opposite to that of spool 116 to maintain communication of the one of passages 142 and 150 which is connected to the pressure inlet port 138 to the reservoir by way of port 146. This insures that the line 136 will be vented to tank, thus signaling that the primary steering system has failed even though there is externally influenced steering of the vehicle and consequent movement of the cylinders 96 and 98 in the follow-up system.

Valve 102 also includes a reset position. Movement of the spool 118 to the left bypasses orifice 132 which was used to maintain fluid pressure on spool 124, to provide a flow exceeding the capacity of a passage 156 in spool 124, to generate sufficient pressure to move the spool 124 back to its rightward position. When the spool 124 is moved to the right, the air in the brake system is vented by way of a port 126 and an exhaust port 160.

It should be noted that upon shutting down the engine and restarting thereof, the entire system must be reset. This is actually quite desirable, since such resetting verifies that the system is in operation.

The spool 106 is provided with a central passage 162 to permit spool 106 to return to a neutral condition upon cessation of steering by bleeding hydraulic fluid from the pressurized chamber to the opposite end of the spool 106, thus allowing it to be recentered by its spring 108. Central passage 162 defines an orifice 164 which restricts flow sufficiently therethrough to insure that the spool 106 will properly shift in response to cylinders 96,98 as described above.

What is claimed is:

1. In a vehicle having a steering system comprising a steering device normally operable in one and the other directions to steer the vehicle, and brake means on either side of the vehicle actuatable by fluid pressure from a fluid pressure source, a vehicle emergency steering system comprising: valve means movable to a first position to be mechanically interengaged with the steering device for response to movement of the steering device in one direction to direct fluid pressure from the fluid pressure source to only the brake means of one side of the vehicle to brake-steer the vehicle in one direction, and for response to movement of the steering device in said other direction to direct fluid pressure from the fluid pressure source to only the brake means on the other side of the vehicle to brake-steer the vehicle in the other direction; said valve means being movable to a second position mechanically disengaged from the steering device so as to be non-responsive to movement of the steering device; and means operatively connected to said valve means for moving the valve means to said first and second positions, wherein the means for moving the valve means to said second position comprise resilient means which bias the valve means in said second position, and wherein the means for moving the valve means to said first position comprise manually actuatable means for so moving the valve means against the resiliency of the resilient means, wherein the means for moving the valve means to said first position further comprise cylinder means extendible upon application of fluid pressure thereto from the fluid pressure source, the manually actuatable means comprising a hand-actuated valve movable manually to direct fluid pressure from the fluid pressure source to the cylinder means to extend the cylinder means.

2. The apparatus of claim 1 wherein the steering device comprises an elongated control rod responsive to movement of a vehicle steering wheel to be movable in one and the other directions along its longitudinal axis, and wherein the valve means comprise first and second valves having first and second extended portions respectively extending to adjacent the control rod when the valve means are in said first position, the first extended portion being movable away from the longitudinal axis of the control rod to open the first valve to direct fluid pressure from the fluid pressure source to only the brake means on the one side of the vehicle, the first extended portion being resiliently biased in the direction toward the longitudinal axis of the control valve to close the first valve, the second extended portion being movable away from the longitudinal axis of the control rod to open the second valve to direct fluid pressure from the fluid pressure source to only the brake means on the other side of the vehicle, the second extended portion being resiliently biased in the direction toward the longitudinal axis of the control rod to close the second valve, and cam means fixed to and extending from the control rod and movable with the control rod to contact either of the extended portions of the first and second valves to move that extended portion away from the longitudinal axis of the control rod to open that valve, whereby the valve means are responsive to movement of the steering device.

3. The apparatus of claim 2 wherein the first and second extended portions each comprise roller means positioned to be in rolling contact with the cam means when the valve means are in said first position.

4. The apparatus of claim 3 wherein the first and second valves are fixed to a platform pivotally secured relative to the vehicle, the pivoting of the platform moving the valve means to said first and second positions.

5. In a vehicle having a steering system comprising a steering device normally operable in one and the other directions to steer the vehicle, and brake means on either side of the vehicle actuatable by fluid pressure from a fluid pressure source, a vehicle emergency steering system comprising: valve means movable to a first position to be mechanically interengaged with the steering device for response to movement of the steering device in one direction to direct fluid pressure from the fluid pressure source to only the brake means of one side of the vehicle to brake-steer the vehicle in one direction, and for response to movement of the steering device in said other direction to direct fluid pressure from the fluid pressure source to only the brake means on the other side of the vehicle to brake-steer the vehicle in the other direction; said valve means being movable to a second position mechanically disengaged from the steering device so as to be non-responsive to movement of the steering device; and means operatively connected to said valve means for moving the valve means to said first and second positions, wherein the means for moving the valve means to said second position comprise resilient means which bias the valve means in said second position, and wherein the means for moving the valve means to said first position comprise cylinder means extendible upon application of fluid pressure thereto from the fluid pressure source, and a valving device operatively connected to the steering device and responsive to non-steering of the vehicle upon actuation of the steering device, to direct fluid pressure from the fluid pressure source to the cylinder means to extend the cylinder means.

6. The apparatus of claim 5 wherein the means for moving the valve means to said first position further comprise manually actuatable means for so moving the valve means against the resiliency of the resilient means independently of the valving device.

7. The apparatus of claim 6 wherein the manually actuatable means comprise a hand-actuated valve movable manually to direct fluid pressure to the cylinder means to extend the cylinder means.

8. The apparatus of claim 7, wherein the steering device comprises an elongated control rod responsive to movement of a vehicle steering wheel to be movable in one and the other directions along its longitudinal axis, and wherein the valve means comprise first and second valves having first and second extended portions respectively extending to adjacent the control rod when the valve means are in said first position, the first extended portion being movable away from the longitudinal axis of the control rod to open the first valve to direct fluid pressure from the fluid pressure source to only the brake means on the one side of the vehicle, the first extended portion being resiliently biased in the direction toward the longitudinal axis of the control valve to close the first valve, the second extended portion being movable away from the longitudinal axis of the control rod to open the second valve to direct fluid pressure from the fluid pressure source to only the brake means on the other side of the vehicle, the second extended portion being resiliently biased in the direction toward the longitudinal axis of the control rod to close the second valve, and cam means fixed to and extending from the control rod and movable with the control rod to contact either of the extended portions of the first and second valves to move that extended portion away from the longitudinal axis of the control rod to open that valve, whereby the valve means are responsive to movement of the steering device.

9. The apparatus of claim 8 wherein the first and second extended portions each comprise roller means positioned to be in rolling contact with the cam means when the valve means are in said first position.

10. The apparatus of claim 9 wherein the first and second valves are fixed to a platform pivotally secured relative to the vehicle, the pivoting of the platform moving the valve means to said first and second positions.

* * * * *

UNITED STATES PATENT OFFICE
CERTIFICATE OF CORRECTION

PATENT NO. : 3,877,537
DATED : April 15, 1975
INVENTOR(S) : Edward J. Ohms, et al It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

*Signed and Sealed this*

*twenty-second* Day of *July 1975*

[SEAL]

Attest:

RUTH C. MASON
*Attesting Officer*

C. MARSHALL DANN
*Commissioner of Patents and Trademarks*